Figure 1:
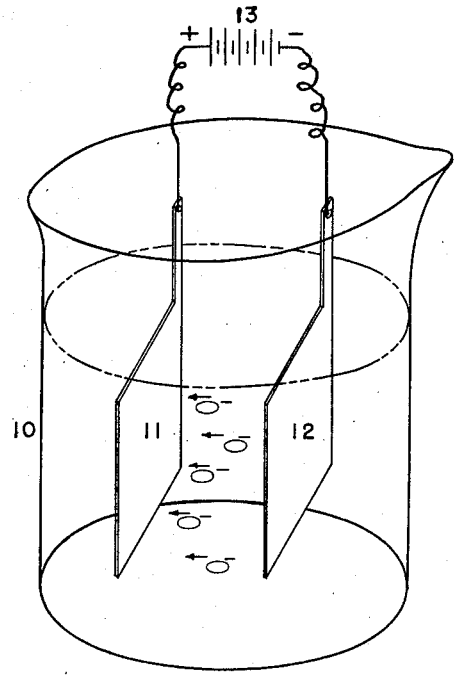

July 12, 1960

T. D. McMINN, JR 2,944,952

POLYMER REMOVAL

Filed July 14, 1953

INVENTOR
T. D. McMinn, Jr.

BY

ATTORNEY

United States Patent Office 2,944,952
Patented July 12, 1960

2,944,952

POLYMER REMOVAL

Talmage D. McMinn, Jr., Texas City, Tex., assignor to Monsanto Chemical Company, St. Louis, Mo., a corporation of Delaware Filed July 14, 1953, Ser. No. 367,913

5 Claims. (Cl. 204—180)

The present invention relates to an improvement in the process for purification or concentration of acetylene by selective solvent action. More particularly, it relates to the removal of polymeric material from the acetylene solvent.

As is known, acetylene may be produced by thermal treatment of hydrocarbons by various methods such as controlled pyrolysis, passage through an electric arc, partial combustion, and the like. In all such methods, acetylene represents only a relatively small percentage of the reaction product, which consists, depending upon the particular process employed, of a gaseous mixture usually containing, in addition to acetylene, hydrogen, carbon monoxide, carbon dioxide, methane, ethylene, and higher acetylenes. The concentration and/or separation of the acetylene is usually accomplished by the use of a suitable selective solvent.

A number of processes for separating acetylene from gaseous hydrocarbon mixtures containing the same by use of a selective solvent are known and are the subject of many U.S. patents. In most of these, the gaseous hydrocarbon mixture is scrubbed with the liquid solvent under conditions of temperature and pressure such that preferential solution of acetylene contained in the mixture is effected while the other hydrocarbons remain essentially undissolved. The acetylene-rich solvent is then stripped of the dissolved gas by reduction of pressure or application of heat or both to obtain a gas considerably richer in acetylene than was the original feed. The solvent is then returned to the absorption cycle for re-use in contacting fresh gas feed thus making possible a continuous process in which it should be possible to employ the solvent for an indefinite period of time.

In actual practice, however, considerable difficulty is experienced in many of such absorption processes because of the formation and build-up of suspended polymeric material in the solvent. Such polymers seriously impair the efficiency of the solvent and eventually cause plugging in the equipment which in turn necessitates periodic shut-down of the process for clean-up of the system. This results in significant production cut-backs as well as much expensive maintenance and calls for the use of excessive amounts of solvent. Attempts to separate these polymers from the solution by conventional means such as centrifugal filtration have not been completely successful because of the extremely small size of the particles of suspended polymer.

It is an object of the invention, therefore, to provide an improved process for the purification or concentration of acetylene.

It is a further object of the invention to provide an improved process for the purification or concentration of acetylene by means of selective solvent techniques.

It is a still further object of the invention to provide an extremely effective and simple method for removing suspended polymeric material from solvents employed in the purification or concentration of acetylene.

Other objects and advantages of the invention will be apparent from the following description of the invention and the appended claims.

It has now been discovered that such polymeric material usually exists in the solvent as a colloidal suspension of spherical particles and that each of the particles carries an electric charge or is capable of accepting one if a small amount of a proper electrolyte is added to the solution. Hence such particulate polymeric matter may be substantially removed from the organic solvent by an electrophoretic process which renders the solvent eminently suitable for recycle and for continuous use over an indefinite period of time.

According to the invention, the polymer-laden organic solution is clarified by subjecting it, in a suitable container, to the action of an electric field established by a direct potential difference between two conducting plates or surfaces. The suspended particles of polymer, depending upon their charge, will migrate toward the plate having a charge opposite that on the particle and there will be discharged to form an agglomerate mass on the surface of the plate leaving a clear solution of the solvent in the container.

Figure 2:
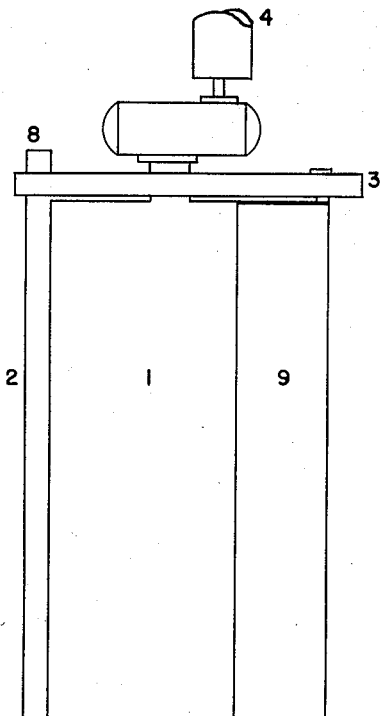
Figure 3:
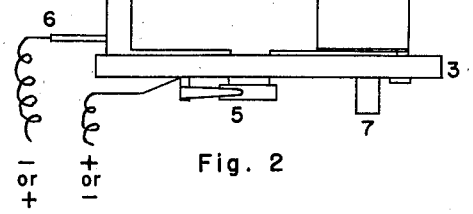

Figure 1 is a line drawing of a simplified form of a suitable apparatus for batchwise practice of the invention consisting of a beaker or like container for holding the contaminated solvent solution and two metallic plates for immersion into the solution which are connected by attached wires to a battery for generation of a direct electric current. Figure 2 is a line drawing of an apparatus designed for continuous operation on a commercial scale while Figure 3 is a side elevation of Figure 2.

The process of the invention may be operated on a batch or continuous basis. The following example will illustrate how batch treatment may be effected. A working solution of butyrolactone, a well-known acetylene solvent, containing a small amount of water, approximately from 0.2–2%, and from 2.5–6.0% of a suspended brownish polymeric material formed and accumulated over the period of time in which the organic solvent had been continuously employed for purifying the acetylene, was poured into the beaker 10 of Figure 1. Two aluminum plates 11 and 12 were immersed in the solution spaced about 3–4 mm. apart and connected to the two poles of a carbon-zinc battery 13 by means of attached wires. As a result of the 40-volt potential thus created, the polymer particles, which in this case were negatively charged, were attracted to the anode. Here they were discharged and coalesced to form an agglomerate mass on the surface of the plate. The other electrode remained clean and free of any particles. After a period of 10 hours, the solution was clear and completely free of all particles of polymer.

Continuous operation on a commercial scale may be readily accomplished as described in the following example to be read in conjunction with the drawing of Figure 2. The apparatus consists of a rotating drum 1 with a conducting surface, the lower portion of which is immersed in a tank 2 which serves as a conduit for the flow of the polymer-contaminated solvent. The ends of the tank 3 serve to insulate electrically the tank from the drum and also to provide bearings for support of the drum. A means for rotating the drum at a predetermined rate is provided by the motor and gear train assembly 4. The drum is charged electrically by the direct current supplied from an external source by means of the slip ring and contactor 5. The tank is also connected to an electrical source through the terminal 6. A liquid inlet 7 and outlet 8 are provided as well as a non-abradable and non-abrasive scraper blade 9 for removal of collected solids.

The acetylene solvent solution containing accumulated particles of polymeric material is introduced into the annular space between the drum 1 and the tank 2 by means of the inlet tube 7. The drum is rotated slowly by means of the mechanism 4 and carries an electrical charge opposite to that of the tank. The polymeric particles suspended in the solution are attracted to the drum and form a cake or layer of solid material thereon which is continuously scraped off by the blade 9 and collected for disposal by burning or other means after entrained solution is removed. As the solution proceeds down the annulus, the particulate polymeric material is gradually all plated out on the drum and the clarified organic solvent emerges from the outlet 8 to be sent to storage facilities for re-use. This operation is sketched in the sectional drawing of Figure 3.

While butyrolactone is specifically mentioned in the example given, the process of the invention is not limited thereto, but is applicable to any organic solvent employed for purifying acetylene by selective solvent action in which suspended polymer forms and accumulates on continuous re-use of the solvent. Among the large number of suitable solvents for acetylene may be mentioned acetone, dimethyl formamide, N-methyl pyrrolidone, organic phosphate esters such as tris dimethylamido phosphate, dimethyl sulfoxide, etc.

The electromotive force employed depends upon such factors as the resistance of the solution, spacing of the plates, the desired speed of operation, and the like. In most cases, however, the voltage applied must be in excess of five volts.

Any source of direct current of the desired voltage may be employed, e.g., alternating current rectified by selenium, mechanical or vacuum tube rectifiers, batteries, or a direct current generator.

The electrodes may be of similar or dissimilar materials. They may be fashioned from any of a large number of metals or conducting materials such as carbon. Platinum, aluminum, chrome plated steel, stainless steel, etc., are all suitable with stainless steel electrodes being preferred.

What is claimed is:

1. A process for purifying an organic solvent which has been used for purification of acetylene by absorption and is contaminated by the presence of suspended polymeric material which comprises subjecting said solvent, in a suitable apparatus, to the action of an electric field established by a direct potential difference between two conducting surfaces.

2. A process for purifying an organic solvent which has been used for purification of acetylene by absorption and is contaminated by the presence of suspended polymeric material which comprises subjecting said solvent, in a suitable apparatus, to the action of an electric field established by a direct potential difference between two conducting surfaces, whereupon the polymeric material is deposited upon one of said surfaces and the solvent is recovered essentially free of such polymeric material.

3. A process for purifying butyrolactone which has been used for purification of acetylene by absorption and is contaminated by the presence of suspended polymeric material which comprises subjecting said butyrolactone solution, in a suitable apparatus, to the action of an electric field established by a direct potential difference between two conducting surfaces, whereupon the polymeric material is deposited upon one of said surfaces and the butyrolactone is recovered essentially free of such polymeric material.

4. A process for purifying N-methyl pyrrolidone which has been used for purification of acetylene by absorption and is contaminated by the presence of suspended polymeric material which comprises subjecting said N-methyl pyrrolidone solution, in a suitable apparatus, to the action of an electric field established by a direct potential difference between two conducting surfaces, whereupon the polymeric material is deposited upon one of said surfaces and the N-methylpyrrolidone is recovered essentially free of such polymeric material.

5. A process for purifying a tris dimethylamido phosphate solution which has been used for purification of acetylene by absorption and is contaminated by the presence of suspended polymeric material which comprises subjecting said tris dimethylamido phosphate solution, in a suitable apparatus, to the action of an electric field established by a direct potential difference between two conducting surfaces, whereupon the polymeric material is deposited upon one of said surfaces and the tris dimethylamido phosphate is recovered essentially free of such polymeric material.

References Cited in the file of this patent

UNITED STATES PATENTS

| | | |
|---|---|---|
| 1,931,725 | Girvin | Oct. 24, 1933 |
| 2,063,680 | Isham | Dec. 8, 1936 |
| 2,077,505 | Woelfein | Apr. 20, 1937 |
| 2,292,608 | Buckman | Aug. 11, 1942 |
| 2,485,335 | Tyson | Oct. 18, 1949 |
| 2,715,947 | Alexander | Aug. 23, 1955 |